(12) United States Patent
Yoon et al.

(10) Patent No.: US 10,996,459 B2
(45) Date of Patent: May 4, 2021

(54) TRANSMITTANCE-VARIABLE ELEMENT

(71) Applicant: LG Chem, Ltd., Seoul (KR)

(72) Inventors: Young Sik Yoon, Daejeon (KR); Tae Gyun Kwon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 131 days.

(21) Appl. No.: 16/326,510

(22) PCT Filed: Sep. 5, 2017

(86) PCT No.: PCT/KR2017/009669
§ 371 (c)(1),
(2) Date: Feb. 19, 2019

(87) PCT Pub. No.: WO2018/048164
PCT Pub. Date: Mar. 15, 2018

(65) Prior Publication Data
US 2020/0124935 A1    Apr. 23, 2020

(30) Foreign Application Priority Data

Sep. 9, 2016 (KR) .......................... 10-2016-0116488

(51) Int. Cl.
*G02F 1/167* (2019.01)
*G02F 1/1676* (2019.01)
(Continued)

(52) U.S. Cl.
CPC ................ *G02B 26/02* (2013.01); *E06B 9/24* (2013.01); *G02F 1/167* (2013.01); *E06B 2009/2464* (2013.01); *G02F 2001/1678* (2013.01)

(58) Field of Classification Search
CPC .... G02B 6/005; G02B 6/0066; G02B 26/026; G02B 26/0841; G02B 26/00;
(Continued)

(56) References Cited

U.S. PATENT DOCUMENTS 7,767,048 B2 *  8/2010 Kanbayashi ...... G02F 1/133305
                                                                   156/196
8,089,228 B2   1/2012 Shimodaira et al.
(Continued)

FOREIGN PATENT DOCUMENTS

EP       2648038 A1    10/2013
JP    2009157344 A      7/2009
(Continued)

OTHER PUBLICATIONS

Extended European Search Report including Written Opinion for Application No. EP17849048.8, dated Aug. 8, 2019, pp. 1-11.
(Continued)

*Primary Examiner* — Jie Lei
(74) *Attorney, Agent, or Firm* — Lerner, David, Littenberg, Krumholz & Mentlik, LLP

(57) ABSTRACT

The present invention relates to a transmittance-variable element. The transmittance-variable element of the present application may comprise two substrates each comprising an electrode, an electrophoresis layer provided between the substrates, and a plurality of wiring groups, and may control transmission regions of the element in a stripe form.

20 Claims, 4 Drawing Sheets

(51) Int. Cl.
    *E06B 9/24* (2006.01)
    *G02B 26/02* (2006.01)
    *G02F 1/1675* (2019.01)
(58) Field of Classification Search
    CPC . G02B 26/005; G02B 2207/115; G02F 1/167;
    G02F 1/1676; G02F 2001/1678; E06B
    9/24; E06B 2009/2464
    USPC ................ 359/290–297; 345/48, 73–76, 107
    See application file for complete search history.

(56) References Cited

U.S. PATENT DOCUMENTS

| | | | |
|---|---|---|---|
| 2007/0115250 A1 | 5/2007 | Jeong et al. | |
| 2007/0195236 A1 | 8/2007 | Kim et al. | |
| 2009/0261332 A1 | 10/2009 | Shin et al. | |
| 2014/0307192 A1 | 10/2014 | Stahl et al. | |
| 2015/0068032 A1 | 3/2015 | Cok | |
| 2015/0261348 A1 | 9/2015 | Jang et al. | |
| 2015/0378494 A1* | 12/2015 | Cok | G06F 3/04166 345/174 |
| 2017/0097700 A1 | 4/2017 | Kim et al. | |

FOREIGN PATENT DOCUMENTS

| | | |
|---|---|---|
| JP | 2015505375 A | 2/2015 |
| KR | 200340520 Y1 | 2/2004 |
| KR | 20070052812 A | 5/2007 |
| KR | 20070082957 A | 8/2007 |
| KR | 20090110099 A | 10/2009 |
| KR | 20110071308 A | 6/2011 |
| KR | 20120011532 A | 2/2012 |
| KR | 20120092247 A | 8/2012 |
| KR | 20140097238 A | 8/2014 |
| KR | 20150108003 A | 9/2015 |
| KR | 20150126515 A | 11/2015 |
| KR | 20150134818 A | 12/2015 |
| WO | 2008012934 A1 | 1/2008 |

OTHER PUBLICATIONS

International Search Report for PCT/KR2017/009669 dated Dec. 8, 2017.

* cited by examiner

[Figure 1a]
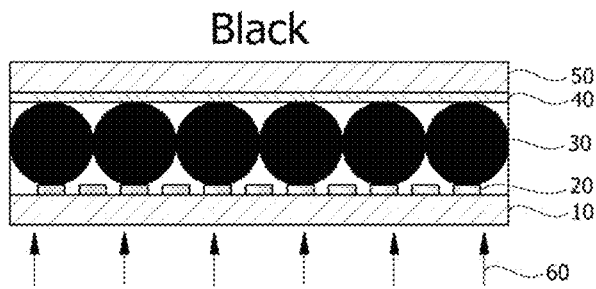
[Figure 1b]
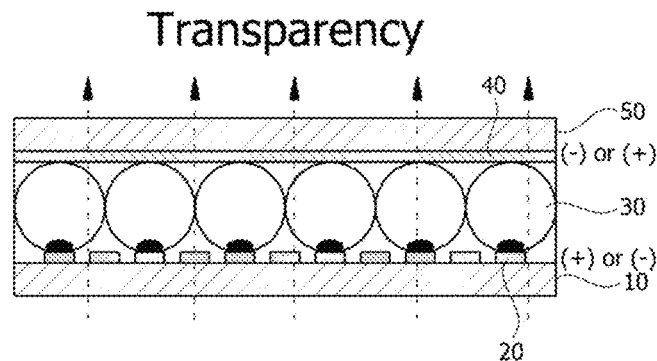
[Figure 2]
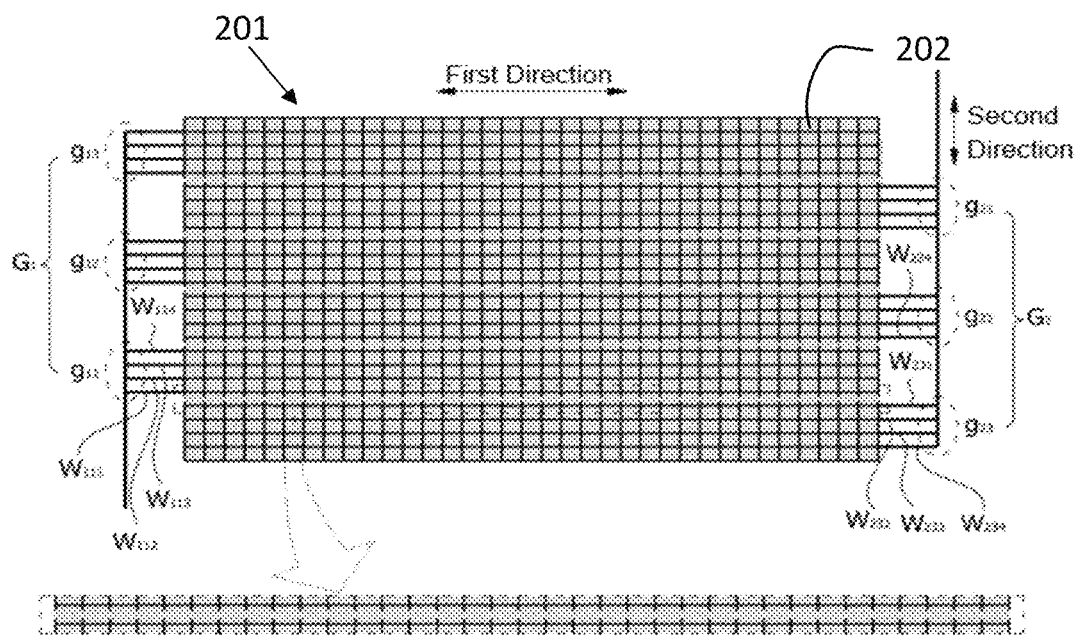

[Figure 3a]
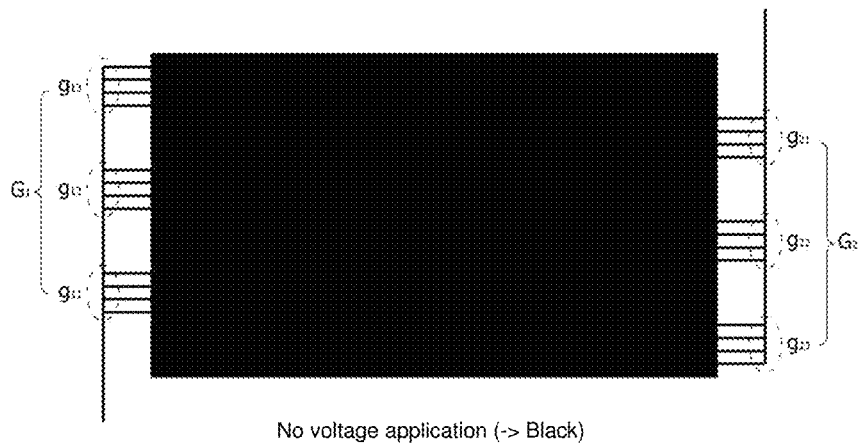
No voltage application (-> Black)
[Figure 3b]
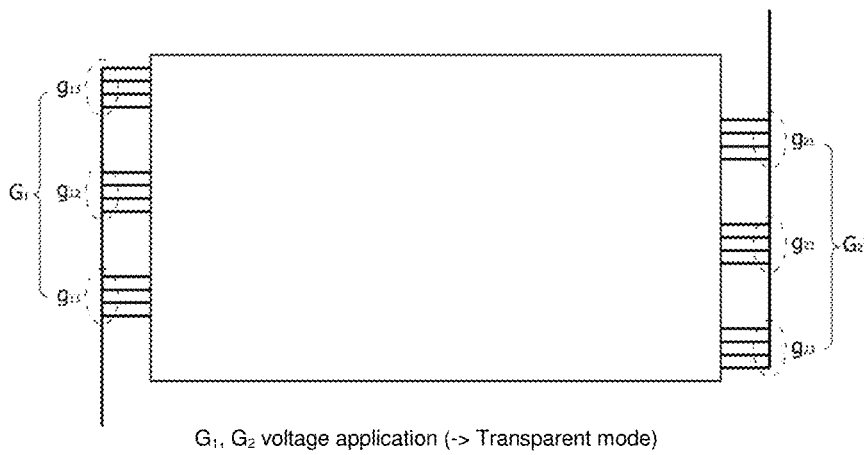
$G_1$, $G_2$ voltage application (-> Transparent mode)

[Figure 3c]
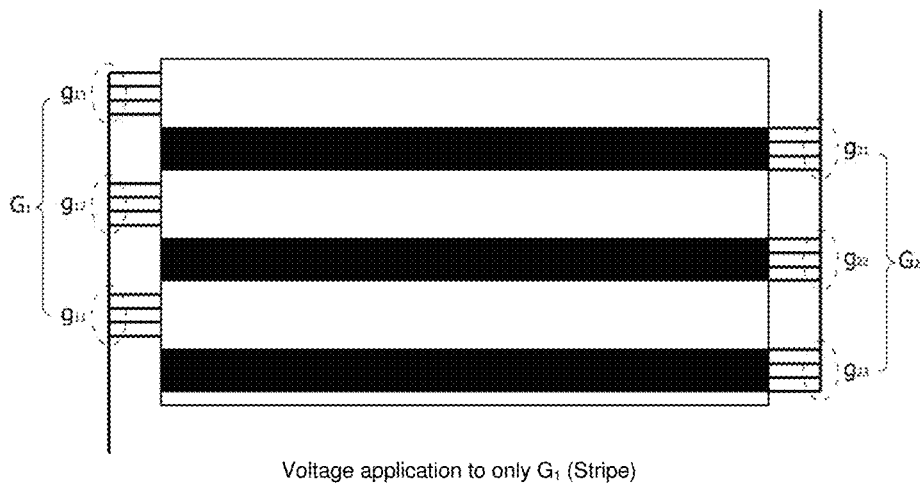
Voltage application to only G₁ (Stripe)
[Figure 3d]
Voltage application to only G₂ (Stripe)

[Figure 4a]
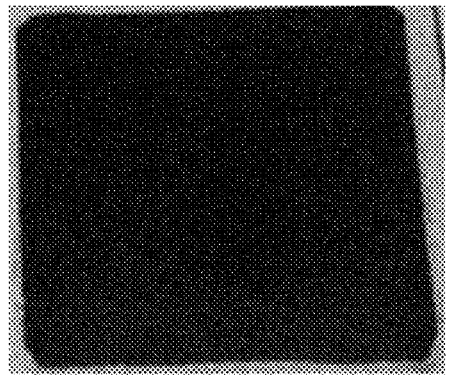
[Figure 4b]
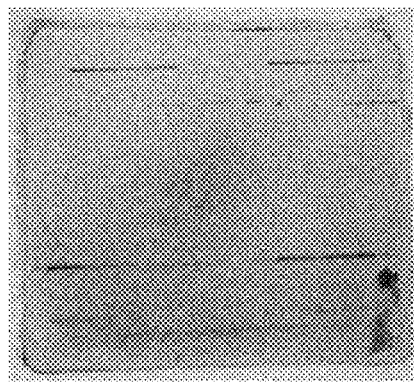
[Figure 4c]
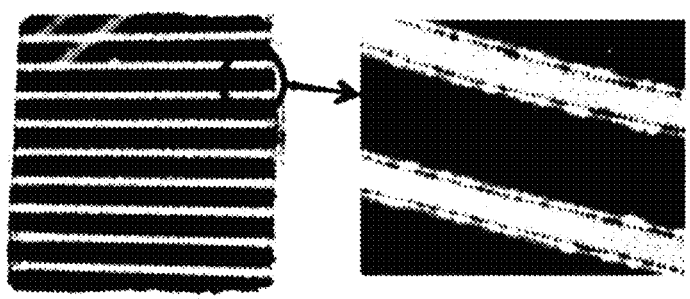

TRANSMITTANCE-VARIABLE ELEMENT

CROSS-REFERENCE TO RELATED APPLICATIONS

The present application is a national phase entry under 35 U.S.C. § 371 of International Application No. PCT/KR2017/009669 filed Sep. 5, 2017, which claims priority from Korean Patent Application No. 10-2016-0116488 filed Sep. 9, 2016, all of which are incorporated herein by reference.

TECHNICAL FIELD

The present application relates to a transmittance-variable element. Specifically, the present application relates to a transmittance-variable element capable of adjusting transmission regions in a stripe pattern.

BACKGROUND ART

Smart windows, which can actively control functions of light reflection, daylighting, or heat transmission due to external light sources, are expected to greatly improve residential cultures and office environments. Such a smart window is typically implemented by a PDLC (polymer dispersed liquid crystal), a SPD (suspended particle device) and an ECD (electrochromic device).

On the other hand, as a next generation display, an electronic paper having excellent portability and capable of providing real-time information can be realized by electrophoresis. The electrophoretic display operates on a principle that an electric field is applied to a fluid, in which charged particles with a chromatic color or an achromatic color, and the like, to move particles and a user can perceive a color change such as black and white due to the movement of the particles.

In the case of the smart window using the electrophoresis method, since the low-resistance electrode wiring material used in the electrophoresis method is usually opaque, it is not easy to selectively implement a light-shielding region, such as a stripe shape. Also, in the case of using a pattern electrode in an electrophoretic element, since due to the pattern electrode having a line width of several mm or more, patterns are visually observed, it is difficult to realize a stripe-shaped light shielding region, and the transparency of the electrode pattern region is lowered, so that it is difficult to use it as a transmission window.

DISCLOSURE

Technical Problem

It is one object of the present invention to provide a transmittance-variable element using an electrophoresis method.

It is another object of the present invention to provide a transmittance-variable element capable of adjusting transmission regions in a stripe form.

The above objects of the present application and other objects can be all solved by the present application which is described in detail below.

Technical Solution

Hereinafter, the transmittance-variable element according to one embodiment of the present invention will be described in detail with reference to the accompanying drawings. For convenience of explanation, the size and shape of each constituent member shown may be exaggerated or reduced.

In one example regarding the present application, the present application relates to a transmittance-variable element. The transmittance-variable element of the present application may comprise two substrates, an electrophoresis layer, and a plurality of wirings. Each substrate may comprise an electrode (layer), and an electrophoresis layer may be provided between the two substrates. The element of the present application comprising the electrophoresis layer can adjust light transmittance of the entire element according to the electrophoresis method.

FIG. 1 schematically shows a state in which transmittance of an element varies in accordance with one embodiment of the present application. FIG. 1(a) schematically shows a cross section of the element before voltage application to an electrode, and FIG. 1(b) schematically shows a cross section of the element after voltage application. As shown therein, the transmission of external light (60) is restricted by charged black particles dispersed in a capsule before voltage application, so that the element has very low transmittance, but while the black particles in the capsule are arranged around electrode lines after voltage application, the transmittance of the external light (60) to the element can be significantly increased.

The transmittance-variable element of the present application may be configured to comprise electrode wirings specially designed so that they can control transmission regions, and electrode lines electrically connected thereto.

At least one of the substrates included in the element of the present application may comprise an electrode having a mesh-shaped pattern. Specifically, the mesh pattern may be formed while intersecting the electrode line extending along a first direction and the electrode line extending along a second direction. In the present application, the first direction and the second direction mean relative directions that when assuming virtual straight lines extending in the respective directions, the virtual straight lines can intersect without being parallel to each other. The angle at which the electrode line of the first direction intersects with the electrode line of the second direction is not particularly limited, but may be, for example, 90°.

In one example, the electrode having a mesh-shaped pattern may be a metal mesh electrode having a low-resistance metal component.

The transmittance-variable element of the present application may comprise an electrode wiring designed so that it can apply the same or different electric signals at the same time or at different times to each region of the electrode having a mesh pattern. The electric signal may mean a voltage or a current, where an application method of the electric signal or a connection method between element configurations for applying the electric signal may be suitably selected by those skilled in the art. FIG. 2 schematically shows a method of electrically connecting an electrode wiring designed so that an electrode region, to which an electric signal is applied, can be selectively changed, and a mesh pattern electrode, according to one example of the present application. In FIG. 2, the lattices located at the center shaded portion mean the mesh pattern electrode 201, and the configuration represented by the left and right symbols G, g, and w means wiring.

In one example, the electrode wiring may comprise a plurality of wiring groups (G or $G_L$). In connection with the wiring group ($G_L$), L is a number of 2 or more, which can be used as a meaning to distinguish wiring groups to which different L values are assigned. For example, as in FIG. 2, when two wiring groups are included in an element, it can be understood that the element includes two different wiring groups ($G_1$, $G_2$). The upper limit of the number of the wiring groups (G) included in the element is not particularly limited.

In one example, the wiring group (G) may be allocated to a plurality of sub-wiring groups (g or $g_{LM}$). M used relating to the sub-wiring group ($g_{LM}$) is a number of 2 or more, which can be used as a meaning to distinguish sub-wiring groups to which two different M values are assigned. At this time, L can be used as a meaning to distinguish the upper wiring group ($G_L$) from which the corresponding sub-wiring groups are branched. For example, as in FIG. 2, when the wiring group ($G_1$) is branched into three sub-wiring groups, it can be said that the wiring group ($G_1$) is allocated to three different sub-wiring groups ($g_{11}$, $g_{12}$, $g_{13}$). Similarly, in FIG. 2, it can be said that the wiring group ($G_2$) is allocated to three different sub-wiring groups ($g_{21}$, $g_{22}$, $g_{23}$). The upper limit of the number of sub-wiring groups branched from the same wiring group is not particularly limited.

In one example, the sub-wiring group (g or $g_{LM}$) may be allocated to a plurality of wiring lines (w or $w_{LMN}$) electrically connected to a plurality of electrode lines 202 directly adjacent to each other while extending along the first direction, respectively. N used relating to the wiring line ($w_{LMN}$) is a number of 2 or more, which may be used as a meaning to distinguish wiring lines to which different N values are assigned. At this time, M can be used as a meaning to distinguish the upper sub-wiring group from which the corresponding wiring lines are branched and L can be used as a meaning to distinguish the upper wiring group from which the sub-wiring groups distinguished through the M are branched. For example, as in FIG. 2, when the sub-wiring group ($g_{11}$) of the wiring group ($G_1$) is branched into four individual wiring lines, it can be said that the sub-wiring group ($g_{11}$) is allocated to four different wiring lines ($w_{111}$, $w_{112}$, $w_{113}$, $w_{114}$). Similarly, as in FIG. 2, it can be said that the sub-wiring group ($g_{23}$) of the wiring group ($G_2$) is allocated to four different wiring lines ($w_{231}$, $w_{232}$, $w_{233}$, $w_{234}$). The upper limit of the number of wiring lines branched from the same sub-wiring group is not particularly limited.

The wiring line (w or $w_{LMN}$) allocated from the sub-wiring group (g or $g_{LM}$) can be electrically connected to the electrode line 202 forming the mesh pattern. More specifically, a plurality of wiring lines allocated from one sub-wiring group may be provided so as to be electrically connected to a plurality of electrode lines 202 directly adjacent to each other while extending along the first direction, respectively. In the present application, the "electrode lines directly adjacent to each other" may mean, for example, the case that when two electrode lines extending in the first direction exist, a third another electrode line extending in the first direction does not exist between them and the two electrode lines are arranged while extending in the same direction side by side to each other. At this time, one electrode line may be electrically connected to only one wiring line (w).

The transmittance-variable element of the present application can be configured so that the electrode regions where the electrophoresis effect appears upon current application are not overlapped with each other for the wiring group (G).

In one example, any one of the plurality of electrode lines 202 electrically connected to one sub-wiring group ($g_{LM}$) allocated from any one wiring group ($G_L$) may be provided so as to be directly adjacent to any one of a plurality of electrode lines 202 electrically connected to the sub-wiring group ($g_{L'M'}$) of the wiring group ($G_{L'}$) different from the wiring group ($G_L$). For example, as in FIG. 2, when the element comprises the first wiring group ($G_1$) and the second wiring group ($G_2$), the third electrode line extending in the first direction may not be present between the electrode line electrically connected to the wiring line ($w_{111}$) allocated from the sub-wiring group ($g_{11}$) of the first wiring group ($G_1$) and the electrode line electrically connected to the wiring line ($w_{231}$) allocated from the sub-wiring group ($g_{23}$) of the second wiring group ($G_2$). This can be confirmed from the fact that the electrode line extending in the first direction does not exist between the electrode line electrically connected to the wiring line ($w_{114}$) allocated from the sub-wiring group ($g_{11}$) of the first wiring group ($G_1$) and the electrode line electrically connected to the wiring line ($w_{224}$) allocated from the sub-wiring group ($g_{22}$) of the second wiring group ($G_2$). Since an electric signal can be applied to a specific electrode line only through a specific sub-wiring group, the configuration as above makes it possible to control an electrode region where an electrophoresis effect appears upon current application.

In one example, different wiring groups (G or $G_L$) may be electrically shorted. Specifically, an electrode line of the first direction electrically connected to the wiring line ($w_{LMN}$) allocated from the sub-wiring group ($g_{LM}$) of the wiring group ($G_L$) and another electrode line of the first direction electrically connected to the wiring line ($w_{L'M'N'}$) allocated from the sub-wiring group ($g_{L'M'}$) of the wiring group ($G_{L'}$) different from the wiring group ($G_L$) can be configured so that they do not intersect with any electrode line extending in the second direction at the same time. For example, as shown in FIG. 2, when an electrode line connected to any one ($w_{111}$) of the wiring lines connected to the sub-wiring group ($g_{11}$) and any one ($w_{231}$) of the wiring lines connected to the sub-wiring group ($g_{23}$) are directly adjacent to each other, the electrode lines of the element of the present application may be formed so as to have no electrode line of the second direction simultaneously intersecting with two electrode lines connected to the wiring lines ($w_{111}$, $w_{231}$), respectively, through a method such as forming the electrode line extending in the second direction discontinuously. That is, the electrode lines connected to the wiring lines branched from any one of the sub-wiring groups are electrically shorted with the electrode lines connected to the wiring lines branched from the different sub-wiring groups.

In one example, the wiring groups (G) can each receive electric signals from a power source at the same time. For example, before the electric signal is applied, the light transmittance of the element is very low as shown in FIG. 3(a), but when the electric signals are simultaneously applied to all the wiring groups, the light transmittance at the top of the element can be increased.

In another example, the wiring groups (G) may each receive electric signals from a power source at different times. Specifically, the element can apply an electric signal to only any one of the wiring groups (G). For example, as in FIG. 3(c), when an electric signal is applied only to the wiring group ($G_1$), the wiring group ($G_1$) is shorted with the wiring group ($G_2$) to each other, as mentioned above, so that an electrophoresis phenomenon occurs only on the surface of the electrode lines connected to the wiring lines ($w_{1mn}$) allocated from the group ($G_1$) and only the region corresponding to the surface of the electrode lines where the electrophoresis phenomenon occurs can be transparent. Conversely, when an electric signal is applied only to the wiring group ($G_2$), the electrophoresis phenomenon can occur in only the surface of the electrode lines connected to the wiring lines ($w_{2m'n'}$) allocated in the wiring group ($G_2$), as in FIG. 3(d).

As mentioned above, the element is configured so that any one of the electrode lines electrically connected to the wiring lines ($w_{LMN}$) allocated from one wiring group ($G_L$) is provided so as to be directly adjacent to any one of the electrode lines electrically connected to the wiring lines ($w_{L'M'N'}$) allocated from the wiring group ($G_{L'}$) different from the wiring group ($G_L$), and the wiring groups (G) are each electrically shorted to each other, and thus the stripe-shaped transmission region can be realized when the electric signal is applied to only one wiring group.

In one example, an electrode formed by intersecting an electrode line extending along the first direction and an electrode line extending along the second direction may be a metal mesh having a pitch ranging from 10 μm to 300 μm. When it has the pitch in the above range, the effect of varying the transmittance by electrophoresis can be obtained without impairing the visibility of the element.

In another example, the electrode lines forming a mesh pattern electrode 201 may each have a line width of 1 μm to 10 μm. If the line width is more than the above range, the pattern itself can be visually recognized, and the state where the charged particles move to the wiring after voltage application is also observed, so that the value of the product itself may be greatly deteriorated.

The electrode having a line width and a pitch in the above ranges may have a low resistance, for example, a specific resistance of $10^{-5}$ ohm·m or less, or $10^{-7}$ ohm·m or less. At this time, the electrode may have a thickness in a range of 10 nm to 10 μm or in a range of 100 nm to 5 μm. In the present application, the "thickness of electrode" may mean a height of the electrode formed on the substrate.

The mesh pattern electrode 201 may comprise a low-resistance metal component. Specifically, the electrode line forming the mesh pattern may be formed by a metal component. The kind of the usable metal component is not particularly limited. As a non-limiting example, a low-resistance metal such as silver (Ag), copper (Cu), aluminum (Al), magnesium (Mg), gold (Au), platinum (Pt), tungsten (W), molybdenum (Mo), titanium (Ti), nickel (Ni) or an alloy containing them can be used for electrode line formation.

The method of providing a mesh pattern electrode 201 is not particularly limited, and various printing methods or patterning methods can be used. In one example, a mesh pattern electrode 201 may be provided through reverse offset printing, which is one of the roll-to-roll methods.

In one example, the mesh pattern electrode 201 may further comprise graphene or carbon nanotubes. For example, the graphene and/or carbon nanotubes can be coated or adsorbed onto the electrode through a method such as immersing an electrode film having the above network in a solution in which graphene and/or carbon nanotubes are dispersed, or spraying a solution in which graphene and/or carbon nanotubes are dispersed onto an electrode film. The electrode further comprising graphene or carbon nanotubes can further improve conductivity. The content of graphene and carbon nanotubes is not particularly limited, but may be used within a range that does not deteriorate transparency of the electrode.

The electrophoresis layer may comprise a plurality of charged particles whose arrangement varies depending on a polarity of a voltage to be applied. To this end, the charged particles may optionally have a (−) or (+) charge. The charged particles are particles having a size of approximate tens nm to several hundred nm, which may use a material capable of blocking light. More specifically, the particles may have a size of 100 nm or less, and for example, may be a material such as carbon black, ferric oxide, chromium copper (CrCu) or aniline black, but is not limited thereto.

The charged particles may be included in the electrophoresis layer together with a dispersion solvent in which the charged particles are dispersed. The content ratio of the charged particles and the dispersing solvent is not particularly limited and may be suitably selected by those skilled in the art.

As the dispersion solvent, a known solvent such as a hydrocarbon-based solvent may be used without limitation. For example, an isoparaffin-based solvent, which is a alkane mixed material having 6 to 13 carbon atoms, as well as a common alkane solvent such as pentane, hexane, heptane, octane, nonane, decane, undecane, dodecane, an isomer or a mixture thereof, and the like can be used. Specifically, isopar C, isopar G, isopar E (Exxon), ISOL-C(SK Chem) or ISOL-G (Exxon), and the like may be used, without being limited thereto.

In one example, the electrophoresis layer may comprise a capsule. Specifically, the electrophoresis layer may comprise one or more capsules containing charged particles and a dispersion solvent therein. The method of preparing the capsule is not particularly limited, and may be prepared, for example, through an O/W (oil in water) emulsion solution provided via emulsification.

The material for forming the capsule is not particularly limited. For example, water-soluble proteins, carbohydrates, vinyl-based polymers, (meth)acrylate-based polymers, urethane-based polymers, polycarbonate-based polymers, siloxane-based polymers, or the like can be used. More specifically, various polymers such as alginate, gelatin, acacia gum, carboxymethyl cellulose, caraginine, casein, albumin and cellulose phthalate, polymethylmethacrylate, polystyrene, polyacrylamide, polyurethane, polyurea, polypeptide, polycarbonate, polydimethylsiloxane or polyolefin can be used, without being limited thereto.

The capsule may have a sealed structure such as a spherical shape or an elliptic spherical shape. In one example, when the capsule is a spherical shape, the capsule may have a diameter in a range of 20 μm to 100 μm, but is not particularly limited.

In one example, the electrophoresis layer may be provided in a film form. For example, it may be a film provided with a plurality of capsules comprising a dispersion solvent and charged particles inside the film of the thin film. When the electrophoresis layer is provided in the film form, the electrophoresis layer can be bonded to a substrate comprising an electrode via a separate adhesive layer or the like, or via a known lamination method.

In another example, the electrophoresis layer comprising the capsules may be formed from a cured product of a coating composition comprising capsules and a curable resin. The specific kind of the curable resin is not particularly limited and it is sufficient if the resin comprises a curable functional group capable of fixing the charged particle-containing capsules between two substrates through thermosetting or photo-curing. One example of the curable functional group may include an acrylate group, an epoxy group, or an isocyanate group, but is not limited thereto. The method of applying the coating composition on the substrate is not particularly limited.

In another example, the electrophoresis layer may comprise a barrier rib. More specifically, the electrophoresis layer may comprise inside the electrophoresis layer one or more barrier ribs that partition the space of the electrophoresis layer in which the charged particles and the solvent are present. The electrophoresis layer comprising the barrier ribs may be provided through a printing process such as roll-to-roll, photolithography, photoresist, or mold printing. For example, the barrier ribs may be provided by providing an acrylic or epoxy-based polymer layer on any one of the substrates and patterning the polymer layer. The method in which the barrier ribs partition the space of the electrophoresis layer is not particularly limited. For example, when the substrate has a rectangular cross-section, a plurality of barrier ribs parallel to one side of the substrate and spaced from each other may be formed in a stripe shape, or a plurality of barrier ribs may also be formed in a lattice shape while intersecting each other. The height or thickness of the barrier rib is not particularly limited and can be suitably controlled by those skilled in the art.

In one example, when the electrophoresis layer comprises barrier ribs, the charged particles and dispersion solvent contained in the electrophoresis layer may be contained in a form directly filled without any capsule in spaces defined by the barrier ribs. Without any particular limitation, the solvent and charged particles can be filled into the respective barrier ribs of the electrophoresis layer through a method such as die coating, casting, bar coating, slit coating, dispense, squeezing, screen printing, or inkjet printing.

In another example, when the electrophoresis layer comprises barrier ribs, the barrier ribs may comprise capsules, where the charged particles and dispersion solvent may be contained inside the capsules. In this case, the capsules may be filled into the barrier ribs together with the binder, and then fixed in the barrier ribs through curing.

In one example, the element may have an electrode comprising a transparent conductive oxide in addition to an electrode having a mesh pattern. The transparent conductive oxide may be exemplified by ITO (indium tin oxide), $In_2O_3$ (indium oxide), IGO (indium galium oxide), FTO (fluor doped tin oxide), AZO (aluminium doped zinc oxide), GZO (galium doped zinc oxide), ATO (antimony doped tin oxide), IZO (indium doped zinc oxide), NTO (niobium doped titanium oxide), ZnO (zink oxide) or CTO (cesium tungsten oxide), and the like, but is not limited thereto. In addition, the electrode may be an OMO (oxide/metal/oxide) electrode in which a metal layer such as silver, copper, or aluminum is interposed between two layers comprising the above-mentioned transparent conductive oxide.

In one example, the element of the present application may further comprise a single or a plurality of power sources for applying electric signals to the wiring groups (G). A method for allowing an electric signal applied from the power source so as to be applied to each wiring group at the same time or at different times can be appropriately selected by those skilled in the art, which is not particularly limited. The power source may apply a voltage of a polarity opposite to the polarity of the charged particles to all electrode lines or some electrode lines forming the mesh pattern. The power supply may, for example, apply a voltage in a range of 20 V to 40 V with its absolute value.

In another example, both of the two substrates may comprise the mesh pattern electrode 201 having the above configuration.

In one example, the transmittance-variable element may further comprise, on the outside surface or the outer surface of each of the two substrates, a light transmissive base material having a transmittance of about 50% to 90% with respect to visible light having a wavelength of 380 nm to 780 nm. The kind of the light transmissive base material is not particularly limited, and for example, transparent glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene), and the like may be used, without limited thereto.

In one example, each of the substrates may have a thickness in a range of 80 μm to 1,000 μm, in a state including both the electrode and the light transmissive base material.

In another example regarding the present application, the present application relates to a smart window. The smart window of the present application may be configured to comprise the transmittance-variable element.

Advantageous Effects

The present application has the effect of the invention that provides the transmittance-variable element which can adjust the transmission regions to a stripe pattern, while using the electrophoresis method.

BRIEF DESCRIPTION OF DRAWINGS

FIG. 1 schematically shows an operating principle of a transmittance-variable element according to one example of the present application. Specifically, FIG. 1(a) shows the element before voltage application, and FIG. 1(b) shows the element after voltage application. The element of the present application comprises a bottom plate electrode (20), charged particle-containing capsules (30) and a top plate electrode (40) between light transmissive base materials (10, 50), whereby the transmittance of the element can change significantly depending on voltage application.

FIG. 2 shows an appearance that wirings designed in accordance with one example of the present application are electrically connected to electrodes of a mesh pattern.

FIG. 3 schematically shows an appearance in which the transmission regions of the element are controlled, according to an embodiment of the present application. In each of the drawings, the black colored part corresponds to a part where external light is not transmitted by the black series charged particles, and the uncolored white part corresponds to a part where light can be transmitted by an electrophoresis effect by current application.

FIG. 4 is images photographing the element with controlled transmission regions according to an example of the present application.

BEST MODE

Hereinafter, the present application will be described in detail through examples. However, the scope of protection of the present application is not limited by the examples as described below.

Examples

Production of Upper Plate Electrode Film

A PET/ITO film with a thickness of 100 μm where ITO was deposited on a PET base material through sputtering was made to a size of 10 cm×10 cm to produce a top plate electrode film.

Production of Bottom Plate Electrode Film

A bottom plate electrode film was produced so as to have an electrical connection relation between the electrode wiring and the electrode lines as in FIG. 2. Specifically, the bottom plate electrode film was produced so that a metal mesh electrode containing Ag and PET were laminated. At this time, an electrode line width of the metal mesh was formed to be 3 μm, and an interval (pitch) between the electrodes was formed to be 80 μm.

Production of Electrophoresis Layer

Gelatin series capsules with a size of 50 μm were produced, in which carbon blacks having a size of 100 nm or less were dispersed in a non-polar hydrocarbon solvent (Isopar G, EXXONMOBIL CHEMICAL). At this time, the carbon blacks were treated to have (−) charges.

The capsules thus produced were applied on the bottom plate electrode film together with a coating solution containing an acrylic resin, and then UV-cured.

Manufacture of Transmittance-Variable Element and Observation of Change in Transmission Region The bottom plate electrode film, the electrophoresis layer, and the top plate electrode film, as produced above, were laminated. A power source was connected to apply a (−) voltage to the top plate electrode and to apply a (+) voltage to the bottom plate electrode and a voltage of about 30 V was applied thereto.

FIG. 4(a) is an image photographing an appearance of the element manufactured from the above before applying a voltage thereto, and FIG. 4(b) is an image photographed when voltage is applied to all wiring groups at the same time. FIG. 4(c) is an image photographing a transparent state changed as the charged particles present in a region where an electric signal is applied move to the surface of the electrode lines to which an electric signal is applied, when an electric signal is applied only to a specific wiring group, and an enlarged image thereof. It can be confirmed that since the peripheral part of the electrode lines connected to the wiring group to which the electric signal is not applied is still in an opaque state (black), the transmission regions of the stripe pattern have been formed.

The invention claimed is:

1. A transmittance-variable element comprising two substrates each comprising an electrode; an electrophoresis layer provided between said substrates; and the electrode having an electrode wiring having a plurality of wiring groups (G) electrically disconnected from each other,
   wherein at least one of said electrodes has a mesh pattern formed by intersecting a first group of electrode lines extending along a first direction and a second group of electrode lines extending along a second direction,
   wherein each of said wiring groups (G) is allocated to a respective plurality of sub-wiring groups (g), where each of said sub-wiring groups (g) is allocated to a respective plurality of wiring lines (w), the wiring lines being electrically connected to the first group of the electrode lines extending along said first direction, respectively, and
   wherein any one of the electrode lines electrically connected to one of the sub-wiring groups ($g_{LM}$) allocated from one wiring group ($G_L$) is directly adjacent to any one of the electrode lines electrically connected to one of the sub-wiring groups ($g_{L'M'}$) allocated from another wiring group ($G_{L'}$) different from said wiring group ($G_L$), wherein an electrical signal applied to each sub-wiring group is independently controlled for transmittance variations.

2. The transmittance-variable element according to claim 1, wherein the plurality of the sub-wiring groups (g) allocated from the same wiring group (G) are provided so that a current is applied simultaneously.

3. The transmittance-variable element according to claim 2, wherein the plurality of the sub-wiring groups (g) allocated from different wiring groups are provided so that a current is applied simultaneously or non-simultaneously.

4. The transmittance-variable element according to claim 3, wherein the first group of electrode lines extending along the first direction electrically connected to the wiring line ($w_{LMN}$) allocated from the sub-wiring group ($g_{LM}$) of said wiring group ($G_L$) and the first group of electrode lines extending along the first direction electrically connected to the wiring line ($w_{L'M'N'}$) allocated from the sub-wiring group ($g_{L'M'}$) of said wiring group ($G_{L'}$) different from said wiring group ($G_L$) are provided so that they do not intersect with the second group of electrode lines extending in the second direction at the same time.

5. The transmittance-variable element according to claim 1, wherein the mesh pattern has a pitch ranging from 10 μm to 300 μm.

6. The transmittance-variable element according to claim 5, wherein the electrode line of said electrode has a line width of 1 μm to 10 μm.

7. The transmittance-variable element according to claim 6, wherein said electrode has a thickness in a range of 10 nm to 10 μm.

8. The transmittance-variable element according to claim 1, wherein said electrode line comprises one or more of silver (Ag), copper (Cu), aluminum (Al), magnesium (Mg), gold (Au), platinum (Pt), tungsten (W), molybdenum (Mo), titanium (Ti), nickel (Ni) or an alloy thereof.

9. The transmittance-variable element according to claim 1, wherein said electrophoresis layer has a plurality of charged particles having a (−) or (+) charge, and said charged particles comprise carbon black, ferric oxide, chromium copper (CrCu) or aniline black.

10. The transmittance-variable element according to claim 9, wherein said electrophoresis layer comprises capsules, and said capsules comprise said charged particles and a dispersion solvent therein.

11. The transmittance-variable element according to claim 10, wherein said capsule has a diameter in a range of 20 μm to 150 μm.

12. The transmittance-variable element according to claim 10, wherein said capsules are formed of at least one of water-soluble proteins, carbohydrates, vinyl-based polymers, (meth)acrylate-based polymers, urethane-based polymers, polycarbonate-based polymers, or siloxane-based polymers.

13. The transmittance-variable element according to claim 9, wherein said electrophoresis layer comprises barrier ribs, and said barrier ribs partition a space where said charged particles and dispersion solvent exist.

14. The transmittance-variable element according to claim 13, wherein said electrophoresis layer comprises capsules, and said capsules comprise said charged particles and a dispersion solvent therein.

15. The transmittance-variable element according to claim 9, wherein said charged particles have a size of 100 nm or less.

16. The transmittance-variable element according to claim 1, wherein said element further comprises, in addition to the electrode having a mesh pattern, an electrode selected from ITO (indium tin oxide), $In_2O_3$ (indium oxide), IGO (indium galium oxide), FTO (fluor doped tin oxide), AZO (aluminium doped zinc oxide), GZO (galium doped zinc oxide), ATO (antimony doped tin oxide), IZO (indium doped zinc oxide), NTO (niobium doped titanium oxide), ZnO (zink oxide), CTO (cesium tungsten oxide) or OMO (oxide/metal/oxide).

17. The transmittance-variable element according to claim 16, wherein said transmittance-variable element comprises a power source electrically connected to two electrodes, and said power source applies a voltage of a polarity opposite to the polarity of said charged particles to said electrode having a mesh pattern.

18. The transmittance-variable element according to claim 1, wherein at least one of said substrates further comprises a light transmissive base material on outside surface or outer surface of the electrode.

19. The transmittance-variable element according to claim 18, wherein each of the substrates have a thickness in a range of 80 μm to 1,000 μm.

20. A smart window comprising the transmittance-variable element according to claim 1.

* * * * *